United States Patent [19]

O'Meara

[11] Patent Number: 4,902,980
[45] Date of Patent: Feb. 20, 1990

[54] MASTER-OSCILLATOR POWER-AMPLIFIER LASER SYSTEM

[75] Inventor: Thomas R. O'Meara, Malibu, Calif.
[73] Assignee: Hughes Aircraft Company, Los Angeles, Calif.
[21] Appl. No.: 274,740
[22] Filed: Nov. 14, 1988

Related U.S. Application Data

[63] Continuation of Ser. No. 30,320, Mar. 26, 1987, abandoned.

[51] Int. Cl.$^4$ ................................................ H01S 3/98
[52] U.S. Cl. ...................................... 330/4.3; 372/21; 372/33
[58] Field of Search .................... 330/4.3; 372/9, 21, 372/33

[56] References Cited

U.S. PATENT DOCUMENTS

| | | | |
|---|---|---|---|
| 3,514,709 | 5/1970 | Jacob | 330/4.3 |
| 3,584,312 | 6/1971 | Statz | 330/4.3 X |
| 3,646,469 | 2/1972 | Buczek et al. | 330/4.3 X |
| 3,700,309 | 10/1972 | Skolnick et al. | 330/4.3 X |
| 3,860,343 | 1/1975 | Janney et al. | 330/4.3 X |
| 4,011,523 | 3/1977 | Mansell et al. | 372/94 X |
| 4,069,458 | 1/1978 | Farcy et al. | 330/4.3 |
| 4,186,353 | 1/1980 | Boutineau | 330/4.3 |
| 4,220,928 | 9/1980 | Bloom et al. | 330/4.3 |
| 4,233,571 | 11/1980 | Wang et al. | 330/4.3 X |
| 4,249,141 | 2/1981 | Brown et al. | 372/41 |
| 4,321,550 | 3/1982 | Evtuhov | 330/4.3 |
| 4,344,042 | 8/1982 | Hon | 330/4.3 |
| 4,399,543 | 8/1983 | Oughstun | 372/94 X |
| 4,501,470 | 2/1985 | Yeh | 350/311 X |
| 4,549,144 | 10/1985 | Summers | 372/94 X |
| 4,551,684 | 11/1985 | Bernhardt | 330/4.3 |
| 4,573,157 | 2/1986 | O'Meara | 372/20 X |
| 4,734,911 | 3/1988 | Bruesselbach | 372/9 X |
| 4,757,268 | 7/1988 | Abrams et al. | 330/4.3 |
| 4,794,344 | 12/1988 | Johnson | 330/4.3 |

OTHER PUBLICATIONS

Optics Letters, vol. 11, No. 3, Mar. 1986, D. A. Rockwell et al, "Coherent Coupling of Laser Gain Media Using Phase Conjugation", pp. 147-149.
Applied Physics B. Photophysics and Laser Chemistry, vol. B39, No. 4, Apr. 1986 V. Michau et al, "Tunable and High-Energy-Q-Switched Operation of an Alexandrite Slave Ring Laser", pp. 219-222.
Soviet Journal of Quantum Electronics, vol. 15, No. 10, Oct. 1985, L. I. Zykov et al, "Feasibility of increasing the maximum gain of optical quantum amplifier", pp. 1420-1421.
Soviet Journal of Quantum Electronics, vol. 17, No. 1, Jan. 1987, I. Yu. Anikeev et al, "Effective Decoupling Method for a Laser System With Wavefront Reversal", pp. 124-126.
Applied Physics B. Photophysics and Laser Chemistry, vol. B36, No. 2, Feb. 1985, I. D. Carr et al, "Performance of a Nd-YAG Oscillator/Amplifier with Phase-Conjugation via Stimulated Brillouin Scattering", pp. 83-92.

Primary Examiner—Thomas H. Tarcza
Assistant Examiner—Mark Hellner
Attorney, Agent, or Firm—V. D. Duraiswamy; P. M. Coble; W. K. Denson-Low

[57] ABSTRACT

An improved phase conjugate master-oscillator power-amplifier laser system for providing a high-power low-distortion laser output beam. The system includes an improved oscillator such as a ring oscillator which rejects any of the output beam which is inadvertently fed back to the oscillator, thereby preventing unwanted oscillation. The system also includes an attenuator such as a spatial filter or an optical isolator that attenuates any amplified spontaneous emissions that may be reflected from the power amplifier to the oscillator, thereby preventing oscillator degradation that would otherwise result. The invention is particularly well-suited for a laser system which employs an SBS mirror for phase conjugation.

33 Claims, 4 Drawing Sheets

4,902,980

MASTER-OSCILLATOR POWER-AMPLIFIER LASER SYSTEM

This application is a continuation of application Ser. No. 030,320, filed Mar. 26, 1987 now abandoned.

BACKGROUND OF THE INVENTION

The present invention relates generally to laser systems, and more particularly to master-oscillator power-amplifier laser systems which include distortion-compensating phase conjugate mirrors.

A high-power laser beam can be obtained by using a master-oscillator power-amplifier ("MOPA") laser system having an oscillator to provide a laser beam and a power amplifier to amplify the beam. However, such an amplifier introduces distortion as it amplifies, and it is necessary to compensate for this distortion in order to provide an output beam of acceptably high quality. One way of compensating for such distortion is to use phase conjugation means such as a phase conjugate mirror.

A phase conjugate mirror receives an input laser beam and provides a "reflected" beam which is a conjugate of the received beam. If the received beam has been distorted by propagation through a distorting medium en route to the phase conjugate mirror, and if the "reflected" conjugate beam is then directed back through the distorting medium, a substantial portion of the distortion vanishes and the conjugate beam emerges, essentially distortion-free, from the distorting medium.

A high-power laser system which uses phase conjugation to compensate for amplifier distortion includes a laser oscillator to provide a laser beam, a power amplifier, a beam splitter to reflect a portion of the beam from the oscillator into the amplifier, and a phase conjugate mirror to receive the amplified beam from the amplifier and to reflect a conjugate beam back through the amplifier. As the conjugate beam goes back through the amplifier, it is further amplified and then passed through the beam splitter to provide a high-power output laser beam. Any distortion introduced into the beam during amplification is removed when the conjugate beam goes back through the amplifier, and accordingly the output laser beam is virtually distortion-free.

The laser oscillator which provides the input beam comprises an amplifying medium disposed between a reflector and an opposing partial reflector. The input beam emerges from the partial reflector and propagates from there toward the beam splitter.

The phase conjugate mirror may comprise a stimulated brillouin scattering ("SBS") mirror. Unlike other kinds of phase conjugate mirrors, SBS mirrors require no "pumps" or other external power supplies and hence are relatively efficient. However, a typical SBS mirror reflects no more than 60% to 80% of the power it receives, and it is therefore necessary to use a very high gain amplifier to make up for this loss and provide the desired high-power output beam. For these reasons, an amplifier having a gain of 200 or more may be required.

Although a MOPA laser system as described, including a high-gain amplifier that offsets losses in the SBS mirror, can provide a well-compensated high-power laser beam, such a system can become unstable. This instability results from the fact that the beam splitter does not pass all of the amplified conjugate beam through to the output. Instead, a portion of this amplified beam is reflected back toward the partial reflector of the oscillator, from whence the beam is reflected back through the splitter toward the amplifier for a second round trip through the amplifier and the SBS mirror. In other words, the combination of the amplifier, the SBS mirror, and the partial reflector constitutes an oscillator. If the round-trip gain through this combination exceeds unity, oscillation occurs, and if the amplifier gain is high enough this unwanted oscillation not only prevents the system from operating as desired but can physically destroy some of the components.

This unwanted oscillation can theoretically be prevented by means of polarizing devices. In one such polarizing device, the input beam is polarized by Brewster windows in the laser oscillator and the polarized beam is then oriented to a desired orientation by a half-wave plate. A polarization-separating beam splitter receives the polarized input beam from the half-wave plate and directs it into the amplifier. A quarter-wave plate between the amplifier and the SBS mirror rotates the polarization of the beam as it passes between the amplifier and the SBS mirror such that, after the return pass through the amplifier, the amplified conjugate beam is orthogonally polarized with respect to the input beam. The polarization-separating beam splitter then directs the amplified beam to the output.

If the polarization of the amplified beam is kept perfectly orthogonal with respect to the polarization of the input beam, no undesired oscillation can occur because only a very small percentage of the amplified beam gets reflected back toward the partial reflector of the oscillator when high quality polarizers are used. However, even a very slight birefringence in the amplifier or in any other system element can depolarize the beam enough to result in oscillation. A depolarization as small as 1% in a system having an amplifier with a gain of 200 can lead to unwanted oscillation.

Another problem is presented by amplified spontaneous emissions ("ASE") originating in and amplified by the amplifier which are reflected by the SBS mirror and then, in passing back through the amplifier, are further amplified. Since the ASE are initially unpolarized, about half of the ASE will be directed by the beam splitter toward the oscillator. Any ASE entering the oscillator can degrade the performance of the oscillator and may even quench the oscillator entirely.

It will be apparent from the foregoing that there is a need for a means to prevent unwanted oscillation in a MOPA laser system having a distortion-compensating phase conjugate mirror, and to prevent any ASE which may be present in the output of such a system from degrading the system oscillator.

SUMMARY OF THE INVENTION

The present invention provides a stable phase conjugate master-oscillator power-amplifier ("MOPA") laser system that provides an undistorted high-power output laser beam. Stability is achieved by preventing feedback between the power amplifier and the oscillator. In addition, the introduction of amplified spontaneous emissions ("ASE") into the oscillator is inhibited, thereby avoiding degradation of the oscillator. A MOPA system according to the present invention can operate at a very high power level without suffering either from instability and resulting unwanted oscillation or from ASE-induced oscillator degradation.

The present invention resides in an improved MOPA laser system including an optical oscillator to provide an input laser beam having a predetermined frequency, a beam splitter to receive the beam from the oscillator, a power amplifier to receive a portion of the beam from the beam splitter and amplify the beam, and a phase conjugating reflector such as an SBS mirror to reflect the amplified portion of the beam back through the power amplifier and thence through the beam splitter to provide an amplified output beam. The improved oscillator means of this invention prevents unwanted destabilizing feedback by rejecting any of the output beam which propagates back toward the oscillator means. This beneficial effect is achieved, for example, by reflecting the unwanted beam away from the optical axis or by isolating the unwanted beam after it enters the oscillator means. ASE-induced oscillator degradation is prevented by attenuation means which attenuates any ASE which may be transmitted from the amplifier back toward the oscillator.

The improved oscillator may include a ring oscillator having an amplifying medium with an input for receiving a laser beam and a plurality of reflectors to reflect the beam along a ring path around the medium for further amplification. One of the reflectors provides the input beam by transmitting a portion of the beam out of the ring path and along an input path toward the beam splitter, and this reflector is oriented to reflect away any of the output beam that might propagate back along the input path toward the oscillator. An optical isolator, such as a Bragg cell isolator or a magneto-optic "Faraday" isolator may be located along the ring path in the oscillator to attenuate any of the output beam which might enter the oscillator and propagate backwardly along the ring path.

A MOPA system may include polarizing means to polarize the input beam and polarity rotation means disposed between the power amplifier and the reflector to rotate the polarity of the beam such that the polarity of the output beam is orthogonal to that of the input beam. The beam splitter in such a system comprises a polarization separating beam splitter. In a MOPA system including such polarizing features and improved according to the present invention, the improved oscillator includes means for polarizing the input beam to cooperate with the polarization separating beam splitter and the polarity rotation means, thereby substantially preventing the degradation of the oscillator due to impingement of unwanted radiation on the oscillator.

ASE which originates in the amplifier is reflected by the SBS mirror along with the amplified oscillator beam and is further amplified on the return pass through the amplifier. Since the ASE is not polarized, even a polarization separating beam splitter will reflect some of the ASE back toward the oscillator, and if the ASE enters the oscillator it degrades the performance of the oscillator. The attenuation means reduces such degradation by attenuating the ASE.

In the present invention the attenuation means may include a spatial filter, such as a filter comprising two lenses and an aperture, the filter being disposed along the input path and operative to attenuate the ASE.

The attenuation means may also include an optical isolator to attenuate the ASE. The isolator may comprise a filter, such as a band pass filter, a notch filter, or a high pass filter, disposed between the oscillator and the beam splitter, or a filter such as a band pass filter disposed between the power amplifier and the reflector.

In a MOPA system having an SBS mirror, the action of the optical isolator may be enhanced by taking advantage of a frequency shift introduced by such a mirror. An SBS mirror, in response to an incident beam of a certain frequency, provides a conjugate beam having a frequency which differs from the frequency of the incident beam by a predetermined amount. In a MOPA system, this means that the conjugate beam provided by the SBS mirror has a frequency which differs from the frequency of the oscillator beam by the above referenced predetermined amount. Since any ASE generated in the amplifier occupies a band of frequencies centered around the oscillator frequency, the ASE frequencies are also shifted by the SBS mirror to a new band centered around the frequency of the conjugate beam. An isolator disposed between the oscillator and the power amplifier can take advantage of this frequency shift and remove the ASE without disturbing the oscillator beam.

Specifically, an improved MOPA system according to the invention includes an isolator which is operative to transmit a beam having a frequency equal to that of the input beam and to attenuate a beam having a frequency equal to that of the conjugate beam. This isolator comprises a filter disposed between the oscillator and the amplifier. The oscillator beam passes through the filter with little or no attenuation, but any ASE which is reflected from the amplifier back toward the oscillator is attenuated because the frequencies of the ASE have all been shifted by the SBS mirror into a band centered around the frequency of the conjugate beam. A second filter, disposed between the amplifier and the SBS mirror, further attenuates the ASE.

It will be appreciated from the foregoing that the present invention represents a significant advance in the field of high-power laser systems. The invention provides a stable phase conjugate MOPA system which outputs a high-power low-distortion output laser beam. The system includes an improved oscillator which does not provide a feedback path between the oscillator and the power amplifier and which is not subject to degradation by ASE.

Other aspects and advantages of the present invention will become apparent from the following detailed description which, when taken in conjunction with the accompanying drawings, illustrates by way of example the principles of the invention.

DESCRIPTION OF THE PREFERRED EMBODIMENT

Existing phase conjugate master-oscillator power-amplifier ("MOPA") laser systems are subject to unwanted oscillation as a result of feedback between the oscillator and the power amplifier and oscillator degradation as a result of amplified spontaneous emissions ("ASE") reflected into the oscillator. The present invention provides a stable phase conjugate MOPA system that provides a high-power, low-distortion laser beam which is not subject to unwanted oscillation or to ASE-induced oscillator degradation.

Figure 1:
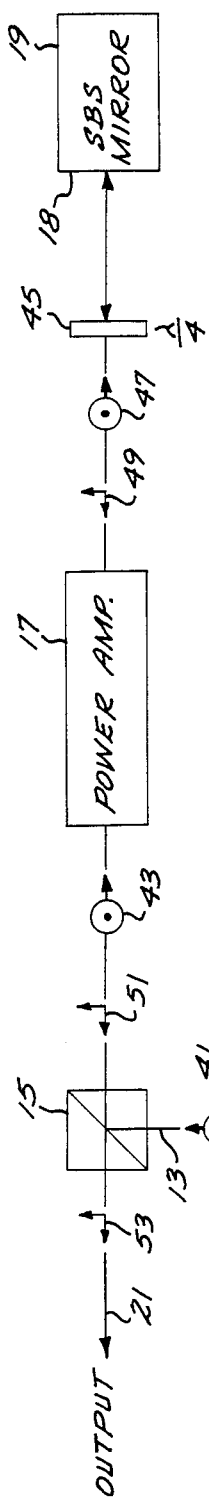
FIG. 1 is a schematic diagram of a basic compensated master-oscillator power-amplifier laser system.
Figure 1:
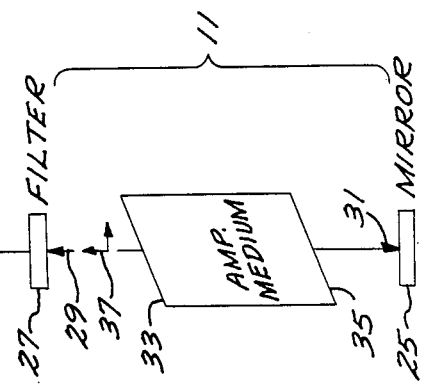

FIG. 1 is an illustration of a basic MOPA system, illustrating the paths of light energy and the basic components. These components include oscillator means 11 to provide along an input path 13 an input laser beam of predetermined frequency, a beam splitter 15 to receive the beam from the oscillator means 11, a power amplifier 17 to receive the beam from the beam splitter 15 and amplify the beam, and a reflector 18 that may comprise an SBS mirror 19 or another kind of phase conjugate reflector, as shown in FIG. 1. The reflector 19 reflects the beam back through the amplifier 17 and thence through the beam splitter 15 to provide an amplified output beam along an output path 21.

The oscillator means 11 includes an amplifying medium 23 disposed between opposing reflectors 25 and 27. A laser beam generated in the oscillator means 11 is reflected back and forth between the reflectors 25 and 27 as indicated generally by arrows 29 and 31. The reflector 27 is partially reflecting and is oriented to transmit a portion of the generated laser beam along the input path 13 to constitute the input laser beam.

Oscillation can occur between the oscillator means 11 and the amplifier 17 because some of the output beam is reflected by the beam splitter 15 back along the input path 13. This reflected beam is re-reflected back toward the amplifier by the mirror 27, and in this way the beam travels back and forth between the mirror 27 and the reflector 18, passing through the amplifier on each trip. If the round-trip gain exceeds unity, oscillation occurs.

The oscillator means 11 may include Brewster windows 33 and 35 adjacent opposing ends of the medium 23 to polarize the input beam as indicated by a polarization symbol 37. A half-wave plate 39 disposed along the input path 13 receives the polarized beam and rotates the polarization of the beam as indicated by a polarization symbol 41. The beam splitter 15 may comprise a polarization separating beam splitter that reflects the polarized beam toward the amplifier 17 as indicated by a polarization symbol 43. Polarity rotation means 45, such as a quarter-wave plate, receives the amplified beam as indicated by a polarity symbol 47 from the amplifier 17 and rotates the polarity of the amplified beam.

The SBS mirror 19 is responsive to the rotated beam to provide a beam that is a conjugate thereof and that has a frequency that has been shifted from the predetermined frequency by a shift amount. The conjugate beam is directed back through the polarity rotation means 45 whereby the polarity thereof is further rotated to provide a beam having a polarity orthogonal to the polarity of the input beam as indicated by a polarity symbol 49, thence back through the amplifier 17 as indicated by a polarity symbol 51 and the beam splitter 15 to provide an amplified output beam along the output path 21, as indicated by a polarity symbol 53.

Figure 2:
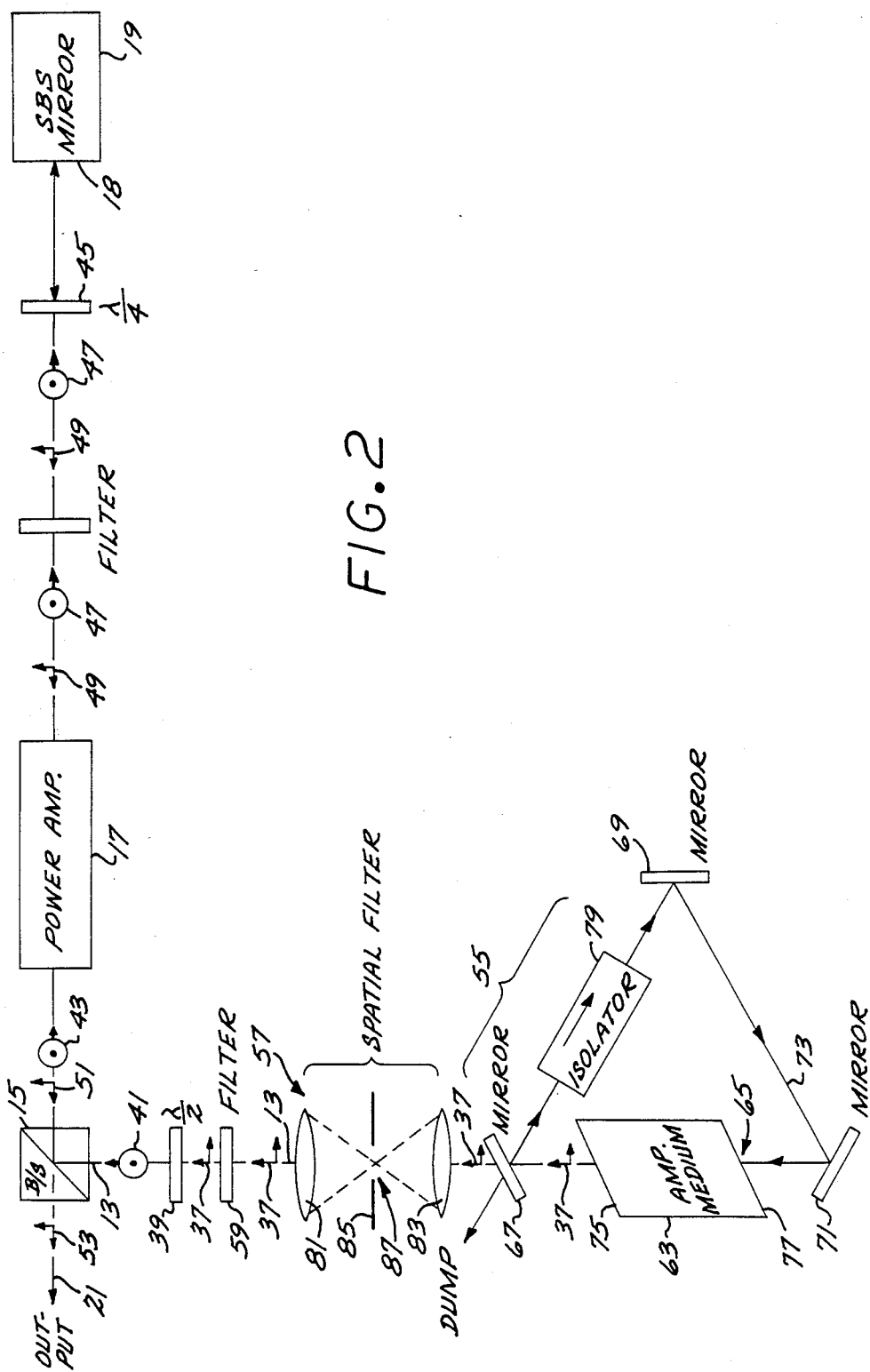
FIG. 2 is a schematic diagram of an improved compensated master-oscillator power-amplifier laser system according to the present invention.

An improved MOPA laser system according to the present invention provides a stable phase conjugate MOPA system that is not subject to unwanted oscillation or to ASE-induced oscillator degradation, as exemplified in FIG. 2. Such an improved laser system is similar in some respects to the system previously described and illustrated in FIG. 1, and for convenience components in FIG. 2 that are similar to components in FIG. 1 are assigned the same reference numerals whereas improved or changed components are assigned different reference numerals.

An improved MOPA system according to the present invention includes improved oscillator means 55 operative to prevent feedback between the oscillator means 55 and the power amplifier 17. Also provided are attenuation means which may comprise a spatial filter 57 or a filter 59 disposed along the input path 13, or a filter 61 disposed between the amplifier 17 and the reflector 18, to prevent any ASE from degrading the performance of the oscillator means 55. This improved MOPA system provides a high-power, low-distortion output laser beam without oscillator degradation or unwanted oscillation between the amplifier 17 and the oscillator means 55.

The improved oscillator means 55 prevents feedback by rejecting any of the output beam that propagates back along the input path 13 toward the oscillator means 55. Specifically, in a MOPA of the kind illustrated in FIG. 1, any of the output beam that is reflected by the beam splitter 15 back toward the oscillator means 11 will be re-reflected by the mirror 27 back toward the power amplifier 17, thereby establishing a feedback loop between the mirror 27 and the reflector 18. In an improved MOPA according to the present invention, the improved oscillator means 55 does not re-reflect the output beam back toward the power amplifier 17. Accordingly there is no comparable feedback loop and unwanted oscillation does not occur.

More particularly, the improved oscillator means 55 includes a ring oscillator comprising an amplifying medium 63 having an input 65 for receiving a forwardly propagating laser beam and operative to amplify the received beam; and a plurality of reflector means 67, 69 and 71, disposed to receive the amplified beam from the medium 63 and operative to reflect the beam forwardly along a ring path 73 around the medium 63 and back into the input 65 for further amplification, one of the reflector means 67 being operative to provide the input beam by transmitting a portion of the amplified beam along the input path 13 toward the beam splitter 15 and to reject any of the output beam that propagates back along the input path 13 by reflecting said output beam away from the input path. The unwanted output beam may be reflected into an absorbing dump (not shown).

The medium 63 may comprise polarizing means such as Brewster windows 75 and 77 to provide a polarized beam as indicated by the polarity symbol 37. The ring oscillator may further comprise an optical isolator 79 disposed to receive a beam propagating along the ring path 73 and operative to attenuate any of the output beam that propagates back along the input path 13 into the oscillator and thence backwardly around the ring path 73. The isolator 79 may comprise a Bragg cell isolator or a magneto-optic "Faraday" isolator.

ASE may originate in the power amplifier 17. This ASE passes through the amplifier 17 and is reflected by the reflector 18 along with the input beam. The reflected ASE is further amplified on its return pass through the amplifier 17. Since the ASE is not polarized, the beam splitter 15 will reflect some of the ASE back toward the oscillator means 55 even if the beam splitter comprises a polarization separating beam splitter. Any ASE that enters the oscillator means 55 degrades the oscillator performance. The attenuation means provided in an improved MOPA system according to the present invention reduces such degradation by attenuating the ASE before it can reach the oscillator means 55.

In particular, the attenuation means comprises the spatial filter 57 disposed along the input path 13 and operative to attenuate the ASE before it can reach the oscillator means 55. The spatial filter 57 comprises two lenses 81 and 83 and aperture-means 85 such as an aperture plate having therein an aperture 87 and disposed between the lenses 81 and 83 whereby a beam propagating along the input path 13 is focused through the aperture 87 by one of the lenses and back onto the input path by the other lens.

The spatial filter 57 exploits the fact that the total ASE power captured by a given cross sectional area is proportional to the field of view of said area, and the lenses 81 and 83 and the size of the aperture 87 are selected to maximize the attenuation of the ASE without significantly attenuating the input beam provided by the oscillator means 55.

The attenuation means may also include an optical isolator to attenuate the ASE. The isolator may comprise the filter 59 disposed between the oscillator means 55 and the beam splitter 15. The filter 59 may comprise a band pass filter, a notch filter, or a high pass filter. Alternatively, the isolator may comprise the filter 61, such as a band pass filter, disposed between the power amplifier 17 and the reflector 18. Such an optical isolator attenuates any ASE reflected toward the oscillator means 55 by the beam splitter 15.

A frequency shift introduced by the SBS mirror 19 may be used to advantage by the filter 59 in attenuating the ASE. An SBS mirror, in response to an incident beam of a certain frequency, shifts the frequency thereof as part of its "reflection" process whereby the SBS mirror provides a conjugate beam having a frequency that differs from the frequency of the incident beam by a predetermined amount. In other words, the conjugate beam provided by the SBS mirror 19 has a frequency that differs from the frequency of the input beam by the above referenced predetermined amount.

Figure 3:
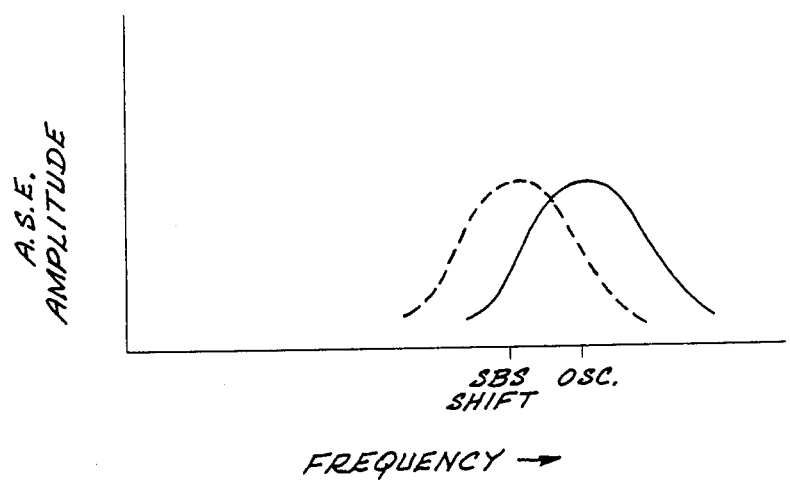
FIG. 3 is a graph showing distribution as a function of frequency of amplified stimulated emissions in a laser beam after the beam has been amplified but before it has entered the phase conjugator of FIG. 1 (solid curve) and after the frequency of the beam has been shifted as a result of passage through the phase conjugator (dashed curve).

Since any ASE generated in the amplifier 17 occupies a band of frequencies centered around the frequency of the input beam, as generally represented by a solid curve 89 in FIG. 3, the SBS mirror 19 shifts the ASE frequencies along with the input beam frequency. The result is a conjugate beam having a frequency that differs from the frequency of the input beam by the predetermined amount and a set of conjugate ASE frequencies occupying a shifted frequency band centered around the frequency of the conjugate beam, as represented by a dashed curve 91. The filter 59 takes advantage of this frequency shift to attenuate the ASE without disturbing the input beam.

Specifically, the filter 59 is operative to transmit a beam having a frequency equal to that of the input beam and to attenuate a beam having a frequency equal to that of the conjugate beam. Accordingly, the input beam from the oscillator means 55 passes through the filter 59 with little or no attenuation, but any ASE that is reflected from the amplifier 17 back toward the oscillator means 55 is attenuated because the frequencies of the ASE have all been shifted by the SBS mirror 19 into a band centered around the frequency of the conjugate beam.

Figure 4:
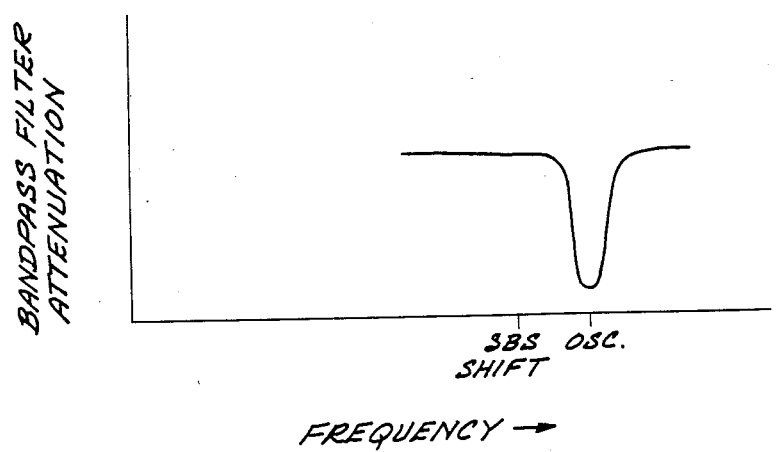
FIG. 4 is a graph showing attenuation as a function of frequency by a band pass filter which can be used for optical isolation in the embodiment of FIG. 2.
Figure 5:
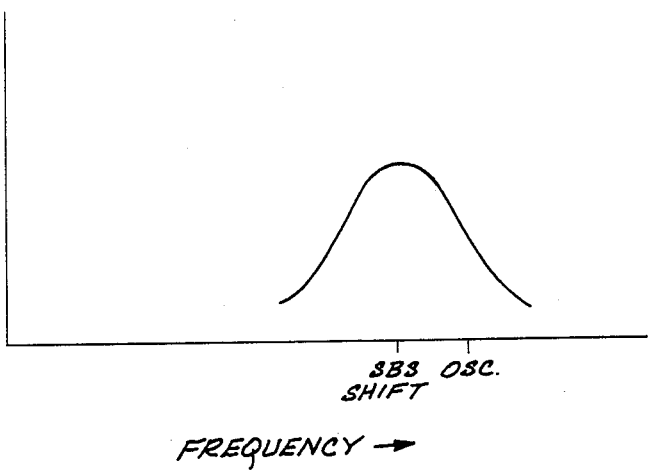
FIG. 5 is a graph showing attenuation as a function of frequency by a notch filter which can be used for optical isolation in the embodiment of FIG. 2.
Figure 6:
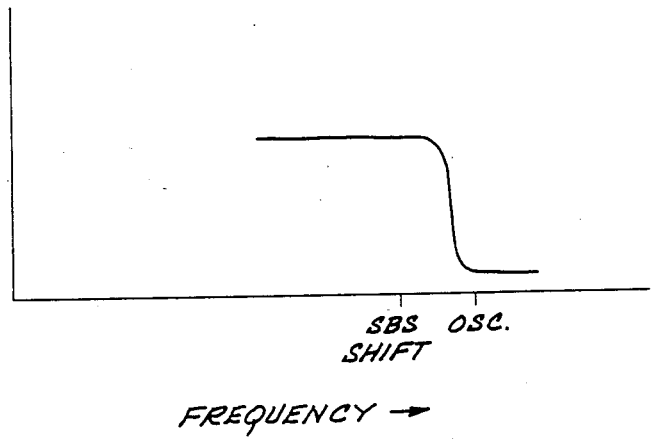
FIG. 6 is a graph showing attenuation as a function of frequency by a high pass filter which can be used for optical isolation in the embodiment of FIG. 2.

The filter 59 may comprise a bandpass filter, operative to transmit a narrow band of frequencies centered around the frequency of the oscillator, as depicted in FIG. 4, or the filter 59 may comprise a notch filter, operative to attenuate a band of frequencies corresponding with the shifted frequencies of the ASE, as depicted in FIG. 5. If the shifted ASE frequencies are lower than the oscillator frequency, then a high pass filter, as depicted in FIG. 6, can be used with similar results. The filter 61, disposed between the amplifier 17 and the SBS mirror 19, further attenuates the ASE. The filter 61 may comprise a broad band filter that has little effect on the input beam or on the conjugate beam but that attenuates other frequencies.

An improved MOPA laser system according to the present invention provides a high-power, low-distortion laser beam. The improved oscillator means of the present invention reject any of the output beam that may be reflected back toward the oscillator, thereby preventing unwanted oscillation. Attenuation means prevent oscillator degradation by attenuating any ASE that may be generated in the power amplifier and reflected toward the oscillator. Accordingly, the present invention provides a stable MOPA system that can operate at very high power levels without suffering from the unwanted oscillation or oscillator degradation that usually accompany such high-power operation.

Although one specific embodiment of the invention has been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

I claim:

1. A master-oscillator power-amplifier optical system which comprises:

a master oscillator comprising ring oscillator means for providing an input laser beam having a predetermined frequency along an input path, said ring oscillator means comprising:

(a) an amplifying medium having an input for receiving a forwardly propagating laser beam and amplifying the received beam; and (b) a plurality of reflector means disposed to receive the amplified beam from the medium along a ring path around the medium and back into the input for further amplification, one of the plurality of reflector means providing the input beam by transmitting a portion of the amplified beam along the input path;

a beam splitter disposed to receive the input beam from said ring oscillator means;

a power amplifier disposed to receive the input beam from said beam splitter and amplify the beam;

a reflector disposed to reflect the beam back through the power amplifier and through the beam splitter to provide an amplified output beam along an output path; and attenuation means including a frequency filter disposed along the input path for rejecting substantially all of the output beam that propagates back along the input path toward said ring oscillator means.

2. A master oscillator power amplifier optical system comprising:

oscillator means for providing an input laser beam along an input path, said oscillator means including a ring oscillator comprising an amplifying medium having an input for receiving a forwardly propagating laser beam and adapted to amplify the received beam, a plurality of reflector means, disposed to receive the amplified beam from the medium and operative to reflect the beam forwardly along a ring path around the medium and back into the input for further amplification, one of the reflector means being operative to provide the input beam by transmitting a portion of the amplified beam along the input path and to reject any of the output beam that propagates back along the input path by reflecting said output beam away from the input path, and polarizing means for polarizing the input beam;

a polarizing separating beam splitter to receive the beam from the oscillator means;

a power amplifier disposed to receive the beam from the beam splitter and amplify the beam;

polarity rotation means for rotating the polarity of the amplified beam;

a phase conjugate mirror responsive to the rotated beam to provide a beam that is a conjugate thereof and to direct the conjugate back through the polarity rotation means whereby the polarity thereof is further rotated to provide a beam having a polarity orthogonal to the polarity of the input beam, back through the amplifier, and thence back through the beam splitter to provide an amplified output beam along an output path; and oscillator means, including attenuation means comprising a frequency filter for rejecting substantially all of the output beam that propagates back along the input path toward the oscillator means.

3. A master oscillator power amplifier optical system which comprises:

ring oscillator means for providing an input laser beam along an input path;

polarizing means disposed along said input path for polarizing the input beam;

a polarization separating beam splitter disposed to receive the beam from the oscillator means;

a power amplifier disposed to receive the beam from the beam splitter and amplify the beam;

polarity rotation means to rotate the polarity of the amplified beam;

an SBS phase conjugate mirror responsive to the rotated beam to provide a beam that is a conjugate thereof and that has a frequency that has been shifted from the predetermined frequency by a shift amount and to direct the conjugate beam back through the polarity rotation means whereby the polarity thereof is further rotated to provide a beam having a polarity orthogonal to the polarity of the input beam, thence back through the amplifier and the beam splitter to provide an amplified output beam along an output path; and an optical isolator for attenuating any amplified spontaneous emissions that may be introduced into the output beam and transmitted back along the input path toward the oscillator means, said isolator comprising a filter disposed between the oscillator means and the beam splitter and adapted to transmit a beam having a frequency equal to that of the input beam and to attenuate a beam having a frequency equal to that of the conjugate beam.

4. A master-oscillator power-amplifier optical system which comprises:

power amplifier means for amplifying a laser beam;

reflector means disposed adjacent to one end of said power amplifier means for reflecting an incident laser beam back through said power amplifier means to provide an amplified output beam along an output path;

a master oscillator comprising ring oscillator means for providing an input laser beam along an input path, said ring oscillator means comprising:

an amplifying medium for amplifying a laser beam; and a plurality of reflector means disposed to reflect an amplified beam provided by said amplifying medium along a ring path and along an input path to said power amplifier means, one of the reflector means being adapted to transmit a portion of the amplified beam along the input path and to reflect the amplified output beam that propagates back along the input path toward said ring oscillator means;

attenuation means for attenuating the output beam that propagates back along the input path toward said ring oscillator means; and a beam splitter disposed between said ring oscillator means and said power amplifier means for coupling the input beam from said ring oscillator means to said power amplifier means and for coupling said amplified output beam out of said optical system along said output path.

5. A master-oscillator power-amplifier optical system which comprises:

power amplifier means for amplifying a laser beam;

reflector means disposed adjacent to one end of said power amplifier means for reflecting an incident laser beam back through said power amplifier means to provide an amplified output beam along an output path;

a master oscillator comprising ring oscillator means for providing an input laser beam along an input path, said ring oscillator means comprising:

an amplifying medium for amplifying a laser beam; and a plurality of reflector means disposed to reflect an amplified beam provided by said amplifying medium along a ring path and along an input path to said power amplifier means, one of the reflector means being adapted to transmit a portion of the amplified beam along the input path and to reflect the amplified output beam that propagates back along the input path toward said ring oscillator means; and a beam splitter disposed between said ring oscillator means and said power amplifier for coupling the output beam from said ring oscillator means to said power amplifier means and for coupling said amplified output beam out of said optical system along said output path.

6. A master-oscillator power-amplifier optical system which comprises:

power amplifier means for amplifying a laser beam;

reflector means disposed adjacent to one end of said power amplifier means for reflecting an incident laser beam back through said power amplifier means to provide an amplified output beam along an output path;

a master oscillator comprising;

ring oscillator means for providing an input laser beam along an input path;

an amplifying medium for amplifying a laser beam;

a plurality of reflector means disposed to reflect an amplified beam provided by said amplifying medium along a ring path and along an input path to said power amplifier means, one of the reflector means being adapted to transmit a portion of the amplified beam along the input path and to reflect the amplified output beam that propagates back along the input path toward said ring oscillator means; and a beam splitter disposed between said ring oscillator means and said power amplifier for coupling the input beam from said ring oscillator means to said power amplifier means and for coupling said amplified output beam out of said optical system along said output path.

7. A master-oscillator power-amplifier optical system which comprises:

power amplifier means for amplifying a laser beam;

phase conjugate mirror means disposed adjacent to one end of said power amplifier means for reflecting an incident laser beam back through said power amplifier means to provide an amplified output beam along an output path;

a master oscillator comprising ring oscillator means for providing an input laser beam along an input path; and a beam splitter disposed between said ring oscillator means and said power amplifier for coupling the input beam from said ring oscillator means to said power amplifier means and for coupling said amplified output beam out of said optical system along said output path.

8. A master-oscillator power-amplifier optical system which comprises:

power amplifier means for amplifying a laser beam;

phase conjugate mirror means disposed adjacent to one end of said power amplifier means for reflecting an incident laser beam back through said power amplifier means to provide an amplified output beam along an output path;

a master oscillator comprising ring oscillator means for providing an input laser beam along an input path to said power amplifier means, said ring oscillator means comprising isolator means for attenuating amplified energy coupled back into the ring oscillator from the power amplifier means; and a beam splitter disposed between said ring oscillator means and said power amplifier for coupling the input beam from said master oscillator to said power amplifier means and for coupling said amplified output beam out of said optical system along said output path.

9. The optical system according to claim 1 wherein said ring oscillator means further comprises an optical isolator disposed to receive a beam propagating along the ring path and operative to attenuate that portion of the output beam that propagates back along the input path into said ring oscillator and thence backwardly around the ring path.

10. The optical system according to claim 1 wherein the isolator comprises a Bragg cell isolator.

11. A MOPA optical system according to claim 9 wherein the isolator comprises a magneto-optic "Faraday" isolator.

12. The optical system according to claim 2 wherein said oscillator means further comprises:

an optical isolator disposed to receive a beam propagating along the ring path and adapted to attenuate the output beam that propagates back along the input path into the oscillator means and backwardly around the ring path.

13. The optical system according to claim 12 wherein the isolator comprises a Bragg cell isolator.

14. The optical system according to claim 12 wherein the isolator comprises a magneto-optic Faraday isolator.

15. The optical system according to claim 3 wherein the filter comprises a band pass filter.

16. The optical system according to claim 3 wherein the filter comprises a notch filter.

17. The optical system according to claim 3 wherein the filter comprises a high pass filter.

18. The optical system according to claim 3 wherein the optical isolator comprises a filter disposed between the power amplifier and the reflector.

19. The optical systems according to claim 18 wherein the filter comprises a band pass filter.

20. A MOPA optical system according to claim 3 which further comprises a spatial filter disposed along the input path and operative to attenuate amplified spontaneous emissions within said oscillator means.

21. The optical system according to claim 20 which further comprises attenuation means for rejecting the output beam that propagates back along the input path toward the oscillator means.

22. The optical system according to claim 21 wherein the ring oscillator comprises:

an amplifying medium having an input for receiving a forwardly propagating laser beam and operative to amplify the received beam;

a plurality of reflector means, disposed to receive the amplified beam from the medium and operative to reflect the beam forwardly along a ring path around the medium and back into the input for further amplification, one of the reflector means being operative to provide the input beam by transmitting a portion of the amplified beam along the input path toward the beam splitter and to reject any of the output beam that propagates back along the input path by reflecting said output beam away from the input path; and means for polarizing the input beam.

23. The optical system according to claim 22 wherein the ring oscillator means further comprises an optical isolator disposed to receive a beam propagating along the ring path and operative to attenuate any of the output beam that propagates back along the input path into the ring oscillator means and thence backwardly around the ring path.

24. The optical system according to claim 23 wherein the isolator comprises a Bragg cell isolator.

25. The optical system according to claim 24 wherein the isolator comprises a magneto-optic Faraday isolator.

26. The optical system of claim 6 which further comprises:

attenuation means for attenuating that portion of said amplified output beam that propagates back along the input path toward said ring oscillator means.

27. The optical system of claim 6 wherein said reflector means comprises phase conjugate mirror means.

28. The optical system of claim 27 wherein said master oscillator comprises:
   an amplifying medium for amplifying a laser beam; and
   a plurality of reflector means disposed to reflect an amplified beam provided by said amplifying medium along a ring path and along an input path to said power amplifier means, one of the reflector means being adapted to transmit a portion of the amplified beam along the input path and to reflect the amplified output beam that propagates back along the input path toward said ring oscillator means.

29. The optical system of claim 28 which further comprises:
   attenuation means for attenuating that portion of said amplified output beam that propagates back along the input path toward said ring oscillator means.

30. The optical system according to claim 8 which further comprises:
   attenuation means disposed between said beam splitter and said ring oscillator means for attenuating the portion of the amplified output beam that is coupled along the input path toward said ring oscillator means.

31. The optical system according to claim 30 wherein the isolator comprises a magneto-optic Faraday isolator.

32. The optical system according to claim 30 wherein the isolator comprises a Bragg isolator.

33. The optical system according to claim 30 wherein said attenuation means further comprises:
   spatial filtering means disposed between said beam splitter and said ring oscillator means for attenuating energy comprising amplified spontaneous emissions present in the amplified output beam that is coupled along the input path toward said ring oscillator means.

* * * * *